United States Patent
Ponec et al.

(10) Patent No.: US 10,056,862 B2
(45) Date of Patent: Aug. 21, 2018

(54) PHOTOVOLTAIC SYSTEM PROTECTION

(71) Applicant: SunPower Corporation, San Jose, CA (US)

(72) Inventors: Andrew J Ponec, Fremont, CA (US); Darren Hau, San Jose, CA (US); Benjamin A. Johnson, Fremont, CA (US); Daniel J. M. Maren, New York, NY (US); William J. Dally, Los Altos Hills, CA (US)

(73) Assignee: SunPower Corporation, San Jose, CA (US)

( * ) Notice: Subject to any disclaimer, the term of this patent is extended or adjusted under 35 U.S.C. 154(b) by 352 days.

(21) Appl. No.: 14/722,138

(22) Filed: May 26, 2015

(65) Prior Publication Data

US 2015/0349709 A1 Dec. 3, 2015

Related U.S. Application Data

(60) Provisional application No. 62/003,046, filed on May 27, 2014.

(51) Int. Cl.
| | |
|---|---|
| *H02J 1/10* | (2006.01) |
| *H02S 50/00* | (2014.01) |
| *H02S 40/32* | (2014.01) |
| *H02S 40/34* | (2014.01) |
| *H02S 50/10* | (2014.01) |

(52) U.S. Cl.
CPC .............. *H02S 50/00* (2013.01); *H02S 40/32* (2014.12); *H02S 40/34* (2014.12); *H02S 50/10* (2014.12)

(58) Field of Classification Search
CPC .......... H02S 40/32; H02S 50/10; H02S 50/00; H02S 40/34

USPC ........................................................... 307/43
See application file for complete search history.

(56) References Cited

U.S. PATENT DOCUMENTS

| | | | | |
|---|---|---|---|---|
| 8,289,183 | B1 * | 10/2012 | Foss | H04Q 9/00 340/870.02 |
| 2008/0236648 | A1 * | 10/2008 | Klein | H01L 31/02021 136/244 |
| 2010/0127577 | A1 | 5/2010 | Bertelsmann et al. | |
| 2010/0288327 | A1 * | 11/2010 | Lisi | H01L 31/02021 136/244 |
| 2011/0172842 | A1 * | 7/2011 | Makhota | H01L 31/02021 700/292 |
| 2012/0268970 | A1 | 10/2012 | Lee et al. | |

(Continued)

OTHER PUBLICATIONS

Extended European Search Report for European Patent Application No. 15799344.5 dated Jan. 26, 2017, 6 pgs.

(Continued)

*Primary Examiner* — Jared Fureman
*Assistant Examiner* — Duc M Pham
(74) *Attorney, Agent, or Firm* — Schwabe, Williamson & Wyatt P.C.

(57) ABSTRACT

A method includes measuring one or more performance metrics of a set of solar cells coupled to an inverter. Based at least on the performance metrics meeting a first criterion, a first subset of the set of solar cells are disabled, reducing a voltage, power, or current provided to the inverter. Based at least on the performance metrics meeting a second criterion, a second subset of the set of solar cells are disabled, further reducing a voltage, power, or current provided to the inverter.

20 Claims, 11 Drawing Sheets

(56) References Cited

U.S. PATENT DOCUMENTS

| | | |
|---|---|---|
| 2012/0316802 A1 | 12/2012 | Presher, Jr. et al. |
| 2014/0028104 A1 | 1/2014 | Makover et al. |
| 2015/0131187 A1* | 5/2015 | Krein .................... H02S 50/00 |
| | | 361/67 |
| 2015/0349708 A1* | 12/2015 | Moslehi ................. H02S 40/30 |
| | | 136/251 |

OTHER PUBLICATIONS

International Search Report and Written Opinion for PCT Patent Application No. PCT/US15/32497 dated Oct. 19, 2015, 9 pgs.
International Preliminary Report on Patentability for PCT Application No. PCT/US15/32497 dated Nov. 29, 2016, 7 pgs.
First Office Action from Chinese Patent Application No. 201580022820.3 dated Feb. 23, 2018, 14 pgs.

\* cited by examiner

PHOTOVOLTAIC SYSTEM PROTECTION

This application claims the benefit, under 35 U.S.C. § 119 (e), of U.S. Provisional Application No. 62/003,046, entitled "Method for Improving Photovoltaic System Performance while Utilizing Voltage-Limiting Devices," filed May 27, 2014, and naming Andrew J. Ponec, et. al, as inventors, which is hereby incorporated by reference herein in its entirety and for all purposes.

FIELD OF THE INVENTION

The present disclosure relates in general to photovoltaic modules and more particularly to component protection in a solar power generation system.

BACKGROUND

Photovoltaic cells are widely used for the generation of electricity from solar light. System designers often trade off various costs and benefits when determining the components of a solar power generation facility. Various design consideration include the amount of area available for the placement of photovoltaic cells, the expected weather conditions, variations in the expected amount of expected sunlight during a day and during various seasons, and the desired amount of power to be provided by the facility.

In addition, economic factors also play a role in design choices. For example, more power can generally be obtained by installing a larger facility with more photovoltaic modules—within the limits of available area. But larger facilities generally come at increased up-front cost. Thus, a system designer may need to keep in mind the cost of photovoltaic modules, inverters, and other components; the savings that may be obtained by not needing to purchase supplemental electricity when needed from a local utility provider; and the price at which excess generated electricity may be sold to a local utility provider. While some of these design choices can involve complex calculations based on estimates of future economic conditions, they all generally involve meeting some goals while reducing the present cost of deploying the solar facility. For a variety of situations, it is helpful to employ designs that make efficient use of the components in a facility.

BRIEF DESCRIPTION OF THE DRAWINGS

The benefits, features, and advantages of the present disclosure will become better understood with regard to the following description, and accompanying drawings.

DETAILED DESCRIPTION

Figure 1:
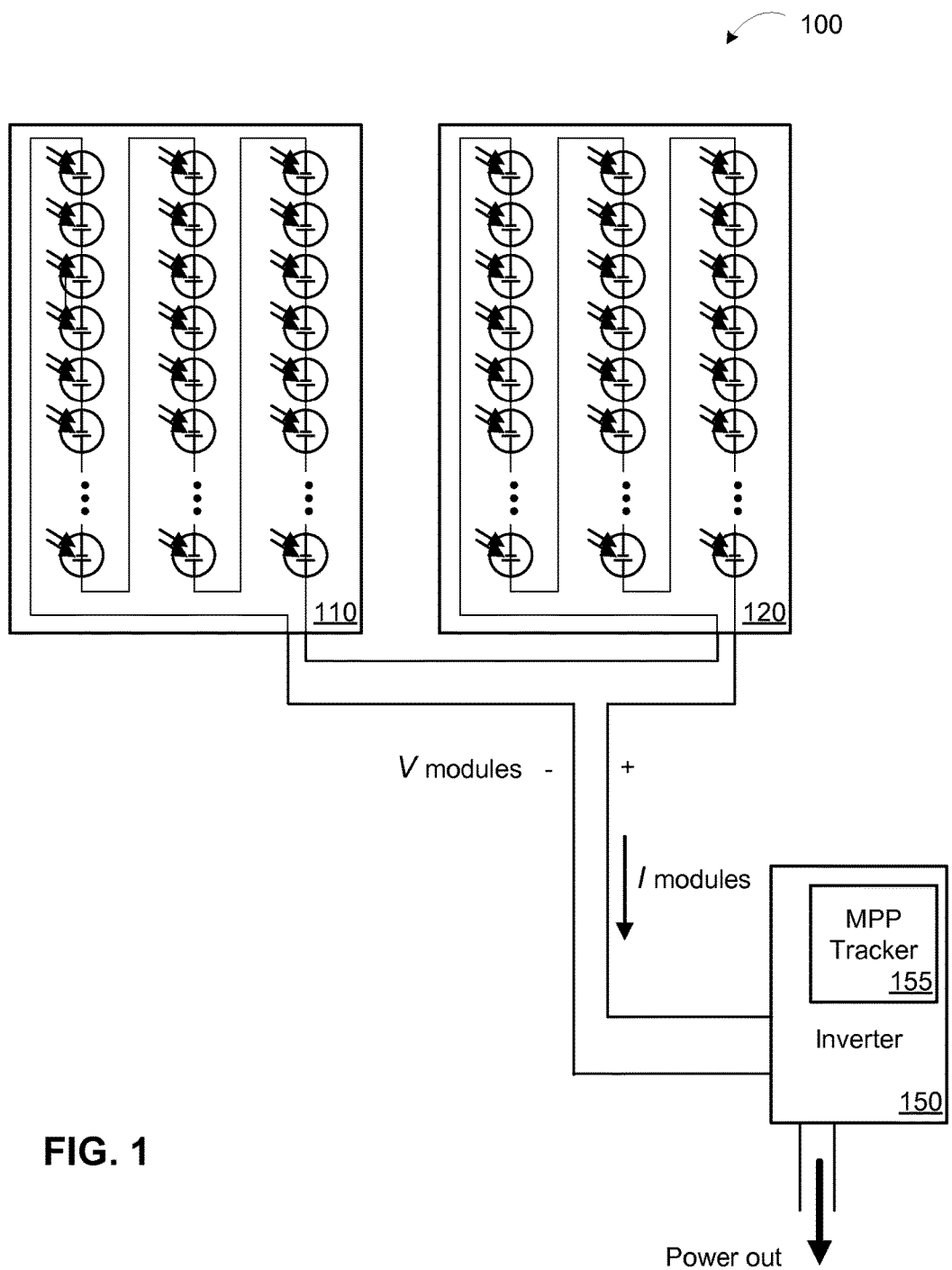
FIG. 1 illustrates one example of a photovoltaic facility 100 that uses two photovoltaic modules.

The following detailed description is merely illustrative in nature and is not intended to limit the embodiments of the subject matter of the application or uses of such embodiments. As used herein, the word "exemplary" means "serving as an example, instance, or illustration." Any implementation or embodiment described herein as exemplary or as an example is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment" or "one example" or "an example." The appearances of phrases such as "in one embodiment" or "in an embodiment" do not necessarily refer to the same embodiment or example. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112(f) for that unit/component.

"First," "Second," etc. As used herein, these terms are used as labels for nouns that they precede, and do not imply any type of ordering (e.g., spatial, temporal, logical, etc.). For example, reference to a "first" string of solar cells in a PV module does not necessarily imply that this string is the first string in a sequence; instead the term "first" is used to differentiate this string from another string (e.g., a "second" string).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

One of the main components of a photovoltaic facility is a collection of photovoltaic cells, or solar cells. Each solar cell is generally constructed on a semiconductor wafer, with two leads that are used to extract electrical power when the solar cell is illuminated by appropriate light. Other components in a photovoltaic facility include various connectors, meters, monitors, inverters, mounting components, sun-tracking devices, batteries, and circuit breakers, among other elements.

The inverters generally represent a non-trivial portion of the cost in deploying a photovoltaic facility. Thus, it may be helpful to employ designs, techniques, structures, or procedures that assist in more efficiently using the inverters and/or reduce the number of inverters that are needed in a facility.

Inverters are particularly relevant in facilities that provide alternating current (AC) power, such as grid-connected facilities. The inverters are used to convert direct current (DC) power produced by solar cells into AC power that is synchronized to the grid waveform. In addition, inverters can be configured to automatically disconnect the photovoltaic facility from the grid in the event of a power failure on the grid (e.g., to avoid energizing the grid while personnel may be performing repairs on the grid). Typical input DC power/output AC power ratios for inverters often range from 1.1-1.5, although inverters with other values are not uncommon.

Inverters may be equipped with components that perform maximum power point (MPP) tracking MPP tracking is used to adjust the load seen by a collection of solar cells during the operation of a photovoltaic facility. MPP tracking is helpful because a too-low load or a too-high load can lead to inefficient use of the solar cells. For example, in the extremes of open-circuit operation (infinite load impedance/zero current) and short-circuit operation (zero load impedance/zero voltage), the power delivered by the solar cells is zero. With MPP tracking, an inverter adjusts the duty cycle of internal switches or other operational features in response to changing environmental conditions (e.g., light intensity, shadows, temperature). These adjustments change the effective impedance that is experienced by solar cells coupled to the inverter.

These tracking adjustments may be performed substantially continuously by the inverter so that the load seen by the solar cells extracts the maximum power available from the solar cells for the current conditions. In various designs, an MPP tracking system in an inverter may monitor the voltage and/or current that is output from a set of solar cells. The MPP tracking system can then adjust the resistance of the inverter so that the inverter draws a maximum power from the solar cells.

In many photovoltaic solar energy systems, a number of solar cells are wired in series within modules, and those modules are also wired in series. The output power of this arrangement is then fed into an inverter or other power conversion or storage device. For economic reasons, it is advantageous to place as many solar modules into a string as possible to minimize the total number of strings in a system (as each new string incurs additional wiring, labor, and other costs).

FIG. 1 illustrates one example of a photovoltaic facility 100 that uses two photovoltaic modules. In this example, facility 100 includes two solar modules 110, 120 and an inverter 150. Modules 110 and 120 each include a plurality of solar cells that are connected in series. In various situations, a photovoltaic module may be called a panel. Thus, in this example, the voltage generated by each module is the sum of the voltages generated by the solar cells in the module. Modules 110 and 120 are also connected in series with respect to inverter 150. The total voltage generated by the modules is therefore the sum of the voltages generated by modules 110 and 120.

This voltage delivered by modules 110, 120 is noted as $V_{modules}$ in FIG. 1. The current delivered by the modules is noted as $I_{modules}$ in FIG. 1. The value of the current and voltage depends on various equipment factors, such as the number and type of solar cells in the module. They also depend on environmental factors, such as the temperature and illumination on the modules. Moreover, they depend on the impedance presented by the load, inverter 150.

Figure 2:
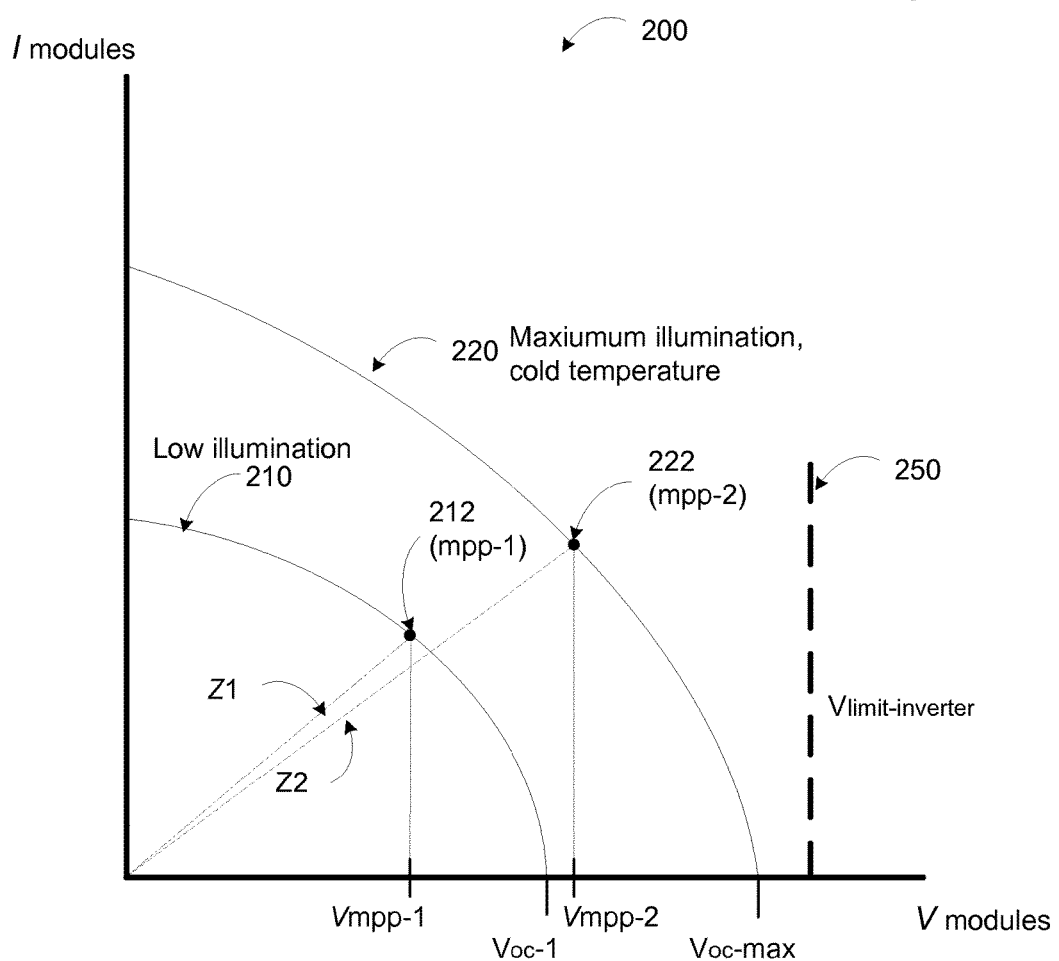
FIG. 2 is an example of a graph of I-V curves for the example facility from FIG. 1.

FIG. 2 is an example of a graph of I-V curves for the example facility from FIG. 1. Two curves are illustrates: I-V curve 210 and I-V curve 220. Curve 220 illustrates the relationship between $I_{modules}$ and $V_{modules}$ when modules 110, 120 from FIG. 1 are in optimal environmental conditions. For example, curve 220 may illustrate the I-V relationship when the modules are illuminated by direct sunshine at normal incidence at a cold temperature, with no obscuring shadows. Under these conditions, the modules are capable of generating high power.

The actual power generated by the modules is the product of their output current and voltage: $I_{modules} \times V_{modules}$. This quantity depends on the amount of load to which the modules are connected. For example, on the left side of curve 220, current is high but voltage is low. In the extreme situation of a short-circuit load, $I_{modules}$ is maximum but $V_{modules}$ is effectively zero, so the output power is zero. As another extreme example, on the right side of curve 220, voltage is high but current is low. In the extreme situation of an open-circuit load, $V_{modules}$ is a maximum value ($V_{oc\text{-}max}$) but $I_{modules}$ is effectively zero, so the output power is again zero.

The maximum power point 222 on curve 220 is denoted as mpp-2. This is the situation when the product $I_{modules} \times V_{modules}$ has its maximum value on curve 220. To achieve this maximum power delivery, the load on the modules needs to be adjusted to a specific value. In FIG. 2, this value is denoted as the impedance $Z_2$; it is the ratio of $V_{modules}$ to $I_{modules}$ at the point mpp-2. If this impedance is provided to the modules under conditions of curve 220, the modules generate a voltage $V_{mpp-2}$ and a maximum power for those conditions. In general, an inverter such as inverter 150 from FIG. 1 bay be equipped with an MPP tracking system 155 that allows the inverter to operate at a maximum power point by adjusting its impedance (e.g., to find an optimal value such as $Z_2$.)

Curve 210 illustrates the relationship between $I_{modules}$ and $V_{modules}$ when modules 110, 120 are in a sub-optimal environmental condition. For example, curve 210 may illustrate the I-V relationship when the modules are illuminated by indirect sunshine and/or at non-normal incidence, and/or at a warm temperature, and/or with some obscuring shadows. Under these conditions, the modules are not capable of generating their highest power. The currents achieved on curve 210 are lower than the currents for curve 220 (at the corresponding voltages). Moreover, the maximum (open-circuit) voltage achieved on curve 210, $V_{oc-1}$, is less than the maximum voltage, $V_{oc-max}$, on curve 220.

Like curve 220, curve 210 has a maximum power point 212 (mpp-1). In this example, the mpp-1 situation occurs under a different loading condition than mpp-2. With the optimal impedance, for conditions of curve 210, the modules generate a voltage $V_{mpp-1}$ and a maximum power for the conditions of curve 210. In this figure, the maximum power point on curve 210 is achieved with a loading impedance of $Z_1$, whereas the maximum power point on curve 220 is achieved with a loading impedance of $Z_2$. This example illustrates that MPP tracking system 155 needs to adjust the load that is provided by the inverter under different environmental conditions, in order to extract maximum power for those conditions.

In various situations, an MPP tracking system may be unable to provide a load that leads to operation at a maximum power point. For example, an inverter may be subject to a power limit (not shown in FIG. 2), and may be damaged if it receives power in excess of that limit. For example, the inverter's power limit may be higher than the power delivered at mpp-1, in which case MPP tracking system 155 can safely maintain operation at mpp-1 during the environmental conditions of curve 210.

However, the inverter's power limit may be lower than the power delivered at mpp-2, in which case MPP tracking system 155 would need to adjust operation away from mpp-2 during the environmental conditions of curve 220. For example, MPP tracking system 155 may be configured to reduce the impedance of inverter 150, leading to operation at a lower voltage than $V_{mpp-2}$, and a safe lower power. More typically, MPP tracking system 155 may be configured to increase the impedance of inverter 150, leading to operation at a higher voltage than $V_{mpp-2}$, and a safe lower power.

FIG. 2 also includes a vertical dashed line that represents a maximum voltage limit 250 that can be tolerated by an inverter such as inverter 150. In general, inverters may be relatively costly devices and may be subject to damage when exposed to excessive voltage. In this example, inverter 150 is rated to receive voltages up to $V_{limit-inverter}$. Accordingly, the other components in the facility should be designed in order that an excessive voltage above this limit is not provided to the inverter.

One approach to protecting the inverter in a solar power generation facility is to make sure that the number of solar cells coupled in series to the inverter is limited so that the maximum voltage that they can generate is less than the acceptable voltage for the inverter. For example, this situation is achieved in the example of FIG. 2, where $V_{oc-max}$ is less than $V_{limit-inverter}$. Thus, the inverter is protected even on bright days with optimal operating conditions, and even in situations when the MPP tracking system in the inverter needs to operate at voltages in excess of $V_{mpp-2}$ (e.g., to avoid unsafe power levels for the inverter.).

Limiting the number of solar cells in this manner protects the inverter from excessive voltage. However, there is some inefficiency in this design choice. Limiting the number of solar cells so that $V_{oc-max}$ is less than $V_{limit-inverter}$ means that under typical operating conditions such as partly sunny days, the maximum power points (e.g. mpp-1) are often substantially lower than the voltage limit $V_{limit-inverter}$. The difference between these voltages varies with cell technology and the particulars of a facility, but is often as high as 25% or more. Therefore, a system may generally operate at voltages far below the safety limits of the inverter.

Figure 3:
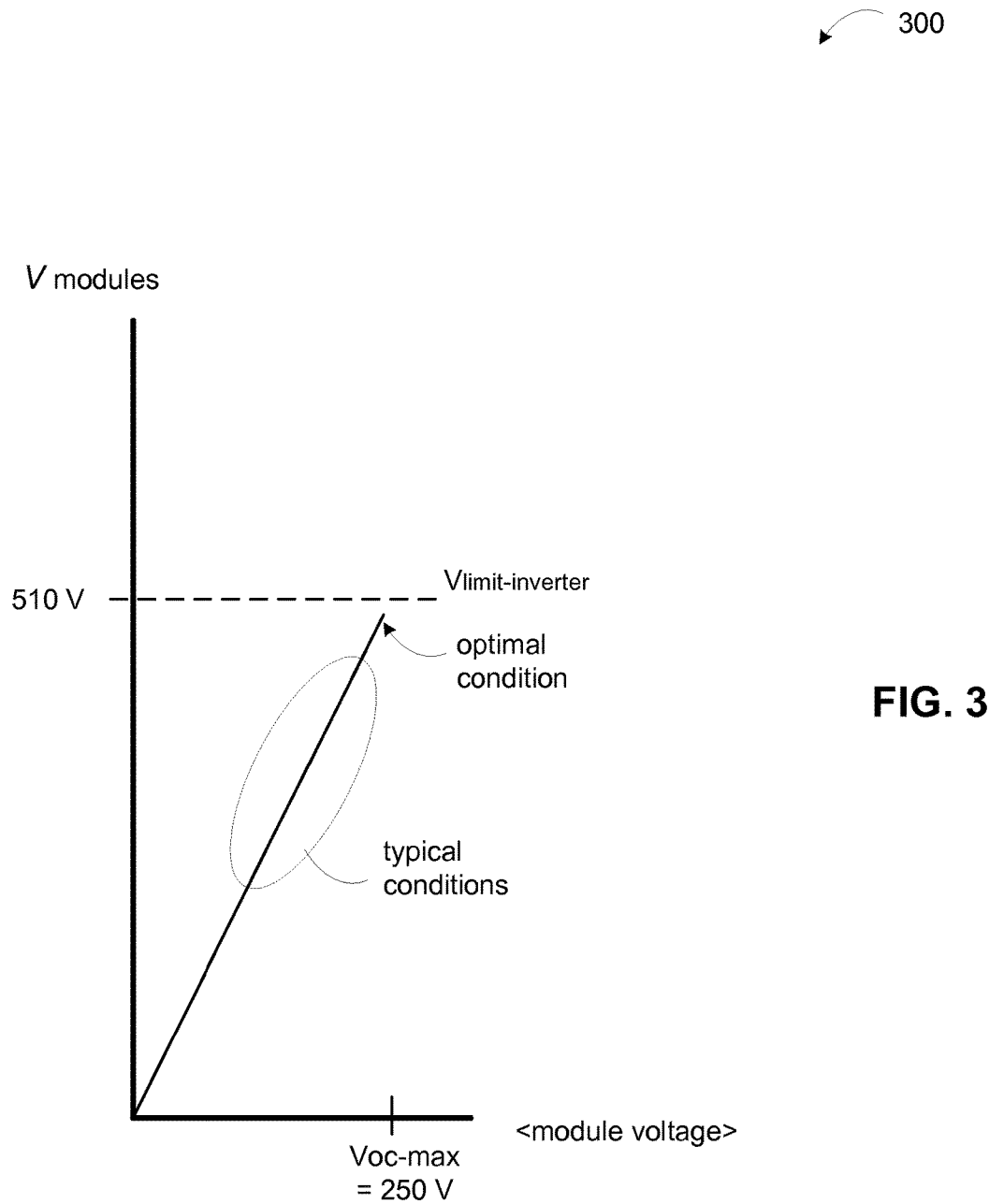
FIG. 3 is a graph showing one example of a relationship between the voltage produced by a series of two modules and an average voltage produced by the individual modules.

FIG. 3 is a graph showing one example of the relationship between the voltage produced by a series of two modules ($V_{modules}$) and the average voltage produced by the individual modules (<module voltage>). In this example, two modules such as modules 110 and 120 from FIG. 1 are connected in series so that the voltages of the two panels add. Thus the graph is a line with a slope of 2. The panels may be selected so that adding each of their maximum voltages ($V_{oc-max}$=250 V in this example) produces less than the limit voltage ($V_{limit-inverter}$=510 V in this example) that is acceptable to an inverter used as a load for the modules.

As illustrated, however, the typical conditions under which the system operates may be at voltages that are substantially less than the acceptable voltage limit. This situation implies that—under typical operating conditions—the inverter (a relatively costly resource) is not being fully utilized. It would be helpful to have a design that could protect an inverter without causing it to be excessively under-utilized.

Figure 4:
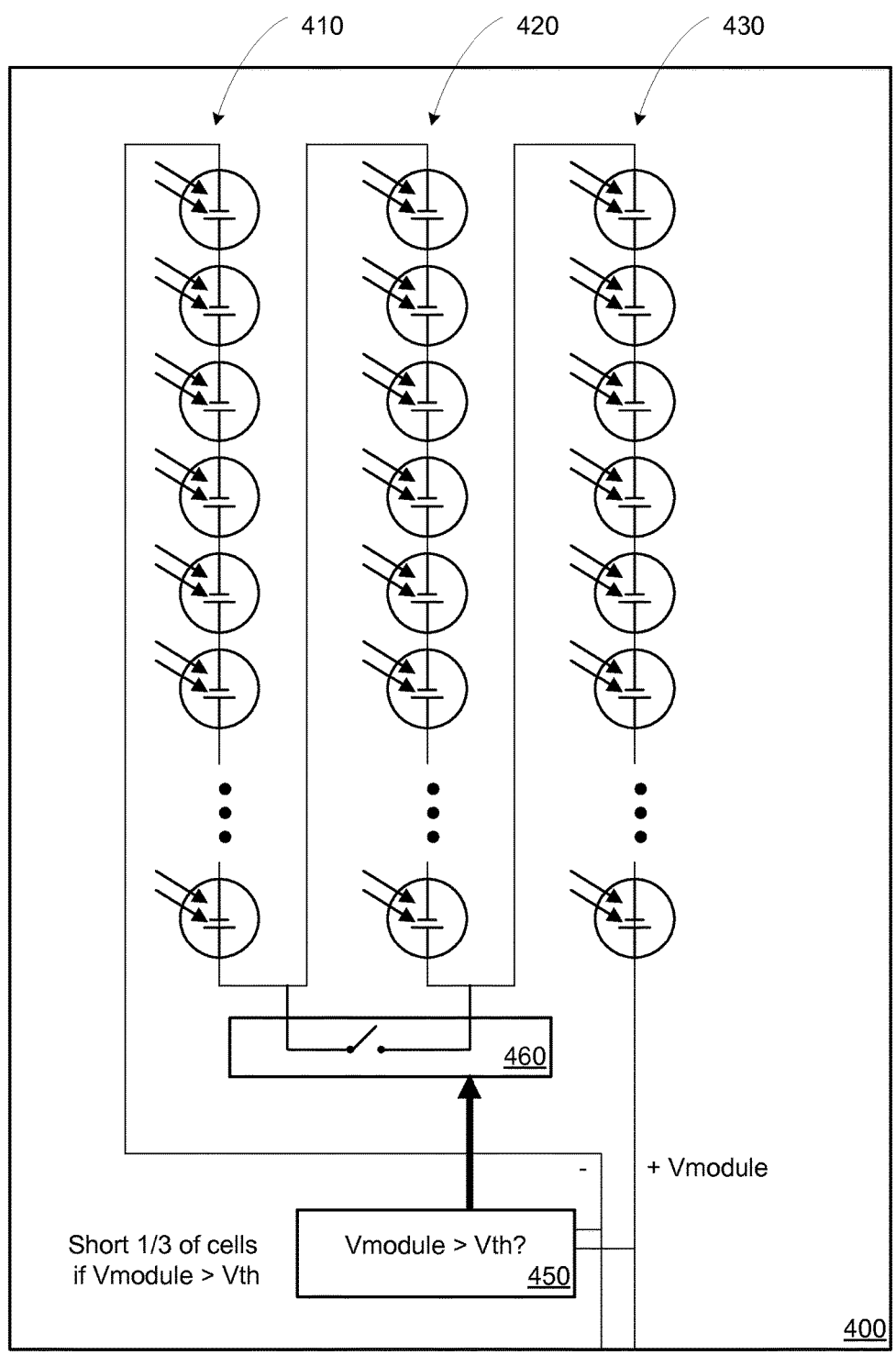
FIG. 4 illustrates an example of a partially-shortable photovoltaic module 400.

FIG. 4 illustrates an example of a partially-shortable photovoltaic module 400. In this example, module 400 includes three substantially similar strings 410, 420, 430 of photovoltaic cells. Strings 410, 420, 430 are connected in series. Module 400 also includes a shorting switch 460 coupled in parallel to string 420. Shorting switch 460 may be a semiconductor device such as a field-effect transistor (FET) or a bipolar power transistor, or a relay, or other form of disconnect, or other electronically controllable, optically controllable, or otherwise controllable switch. When shorting switch 460 is open, the voltage generated by module 400 is substantially the sum of the voltages generated by the three strings 410, 420, 430. When shorting switch 460 is closed, module 400 is partially shorted (or clipped) and the voltage $V_{module}$ generated by the module is substantially the sum of the voltages generated by two strings 410, 430. In situations of uniform illumination and uniform operation of the three strings, partially shorting the module reduces $V_{module}$ to ⅔ of the un-shorted value. (In other examples, partially shorting the module reduces $V_{module}$ to other fractions of the un-shorted value, such as 0.9, 0.8, ¾, 0.7, ⅝, 0.6, 0.5, 0.4, ⅓, 0.3, ¼, 0.2, 0.1, or other factors.)

Shorting switch 460 is controlled by a controller circuit 450. In the illustrated example, controller circuit 450 monitors the voltage $V_{module}$ that is generated by the module and closes shorting switch 460 based on $V_{module}$. For example, the illustration shows that the switch is opened if $V_{module}$ exceeds a threshold voltage $V_{th}$. Thus, the maximum voltage generated by the module is limited to $\tfrac{2}{3}$ of the voltage that would be otherwise generated.

In order to avoid oscillation during conditions of dropping voltage, controller circuit 450 may be equipped with some memory or hysteresis. For example, controller circuit 450 may be configured close the switch whenever the monitored voltage rises above $V_{th}$, and may be configured to open the switch whenever the monitored voltage $V_{module}$ is below $0.9 \times \tfrac{2}{3} \times V_{th}$. (Values other than 0.9 are also possible (e.g., 0.97, 0.95, 0.8, 0.7, 0.5, 0.4), depending on system design and expected operating conditions.) Alternatively, or in addition, controller circuit 450 may use a memory that records the state of switch 460 and/or a rising/falling detector to enable smooth operations.

Figure 5:
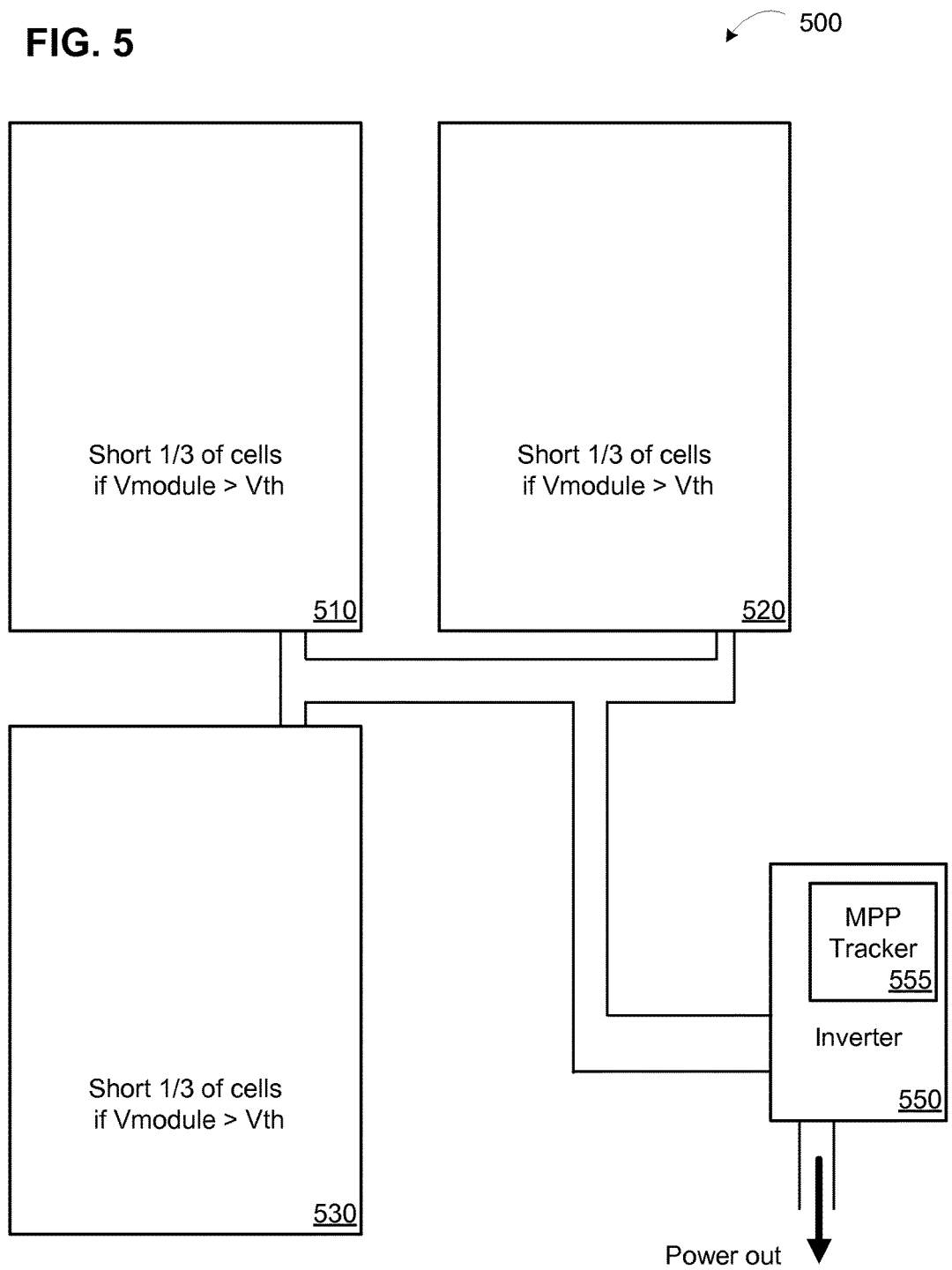
FIG. 5 illustrates one example of a photovoltaic facility 500 that uses three photovoltaic modules such as the module shown in FIG. 4.

FIG. 5 illustrates one example of a photovoltaic facility 500 that uses three photovoltaic modules such as the module shown in FIG. 4. In this example, facility 500 includes three solar modules 510, 520, 530 and an inverter 550. Modules 510, 520, 530 each include a plurality of solar cells that are connected in series. Each of modules 510, 520, 530 is partially shorted by an internal controller when it produces a voltage $V_{module}$ in excess of a threshold voltage $V_{th}$ (as discussed above with regard to FIG. 4). When a module 510, 520, or 530 partially shorted, $\tfrac{1}{3}$ of its internal series-connected solar cells are disconnected. Modules 510, 520, 530 are connected in series with respect to inverter 550. The total voltage generated by the modules is therefore the sum of the voltages generated by modules 510, 520, 530. Because they are partially shorted when their voltages exceed the threshold voltage, the maximum voltage generated by the three modules corresponds to approximately the maximum voltage that would be generated by two of the unshorted modules.

Figure 6:
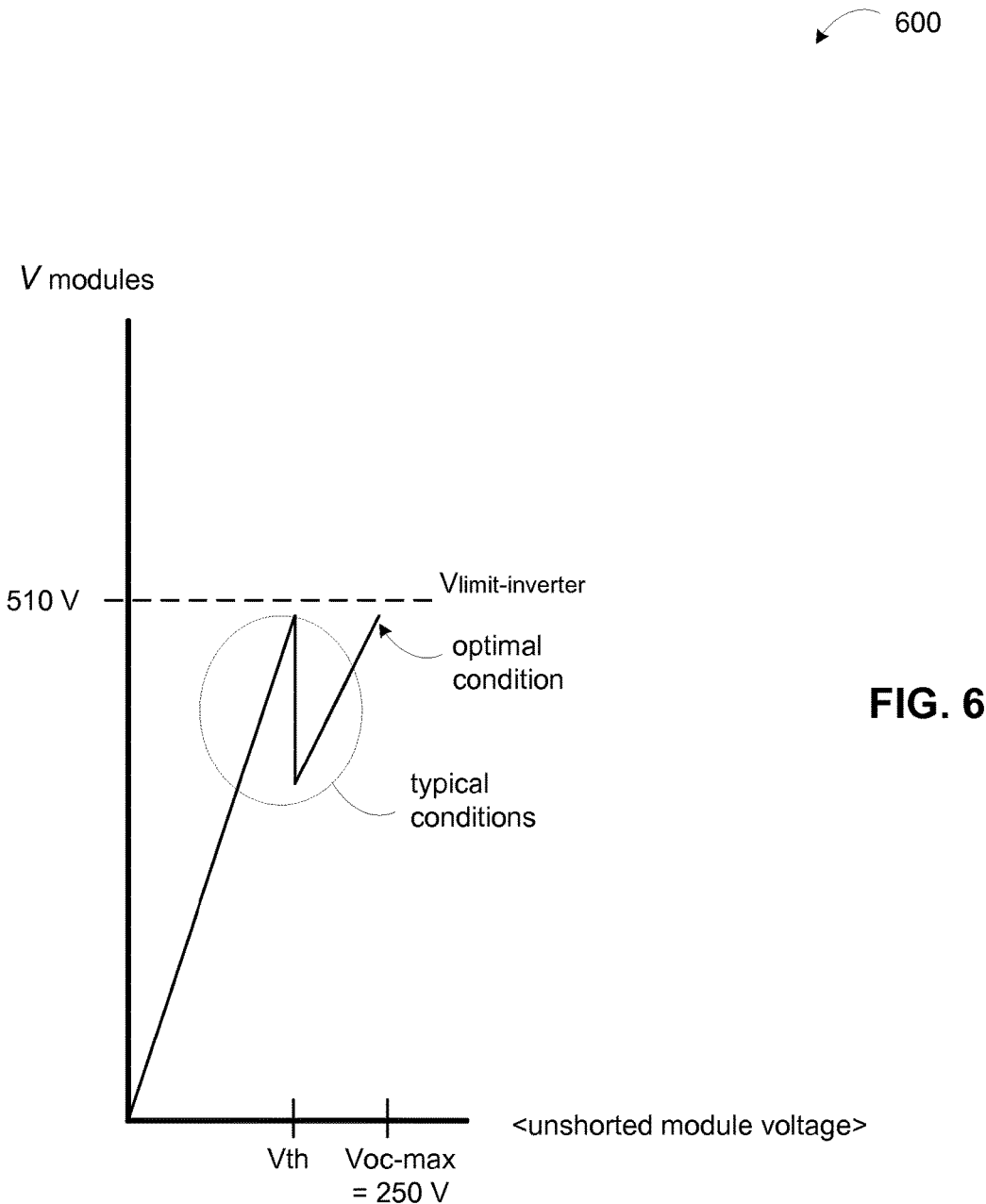
FIG. 6 is a graph showing one example of the relationship between the voltage produced by a series of three partially-shortable modules and the average voltage that would be produced by the unshorted individual modules.

FIG. 6 is a graph showing one example of the relationship between the voltage produced by a series of three partially-shortable modules ($V_{modules}$) and the average voltage that would be produced by the unshorted individual modules (<unshorted module voltage>). In this example, three modules such as modules 510, 520, 530 from FIG. 5 are connected in series so that the voltages of the three modules add. Thus the graph is a line with a slope of 3, for low values of the average unshorted module voltage.

Without partial shorting, the maximum voltage produced by the three modules would exceed the limit voltage $V_{limit-inverter}$ that is acceptable to an inverter used as a load for the modules (e.g., inverter 550). However, because of the automated partial-shorting feature of the modules, the modules operate so that the net voltage generated by the modules effectively drops by $\tfrac{1}{3}$ during high-voltage operation, when the average unshorted module voltage exceeds the threshold voltage $V_{th}$. Thus the graph drops by a factor of $\tfrac{1}{3}$ at <unshorted module voltage>=$V_{th}$, and then proceeds to climb with a slope of 2.

As was the case in FIG. 1, the modules in FIG. 3 operate so that adding up the three individual highest-voltage operations ($3 \times \tfrac{2}{3} \times V_{oc-max}$=250 V in this example) produces less than the limit voltage ($V_{limit-inverter}$=510 V) that is acceptable to the inverter in this example.

When conditions cause the unshorted module voltage to exceed $V_{th}$, the maximum voltage produced ($2 \times V_{oc-max}$) is within the tolerable limit of the inverter $V_{limit-inverter}$.

A comparison of FIG. 3 and FIG. 6 shows that the automated partial-shorting in FIG. 5 may lead to higher voltages during the typical conditions under which the system operates. This situation implies that—under typical operating conditions—the inverter (a relatively costly resource) may be better utilized when connected to an increased number of modules (e.g., 3 modules as in FIG. 5) that automatically partially short some internal cells than when connected to a lower number (e.g., 2 modules as in FIG. 1) that do not have partial shorting. Various examples of partially-shorted solar arrays are described in U.S. patent application Ser. No. 14/572,722 entitled "Voltage Clipping", naming Andrew Ponec et al. as inventors and filed on Dec. 16, 2014, which is hereby incorporated by reference herein in its entirety and for all purposes.

The partial shorting may allow systems to achieve higher voltages during typical operation by limiting the voltage of a section of the array when the voltage exceeds a predefined threshold or setpoint. By placing this threshold voltage near the $V_{mpp}$ of the section of the array, the system can be safely designed around the threshold voltage rather than the temperature de-rated Voc of the section of the array. This approach may substantially increase the number of modules that can be deployed in a string of modules, thereby reducing the total number of strings and/or the total number of required inverters for a given array power.

In various situations, such designs may allow additional power to be generated even in sub-optimal conditions. Alternatively, such as design may mean that a lower-capacity (and perhaps less-expensive) inverter may be used as a substitute.

Figure 7:
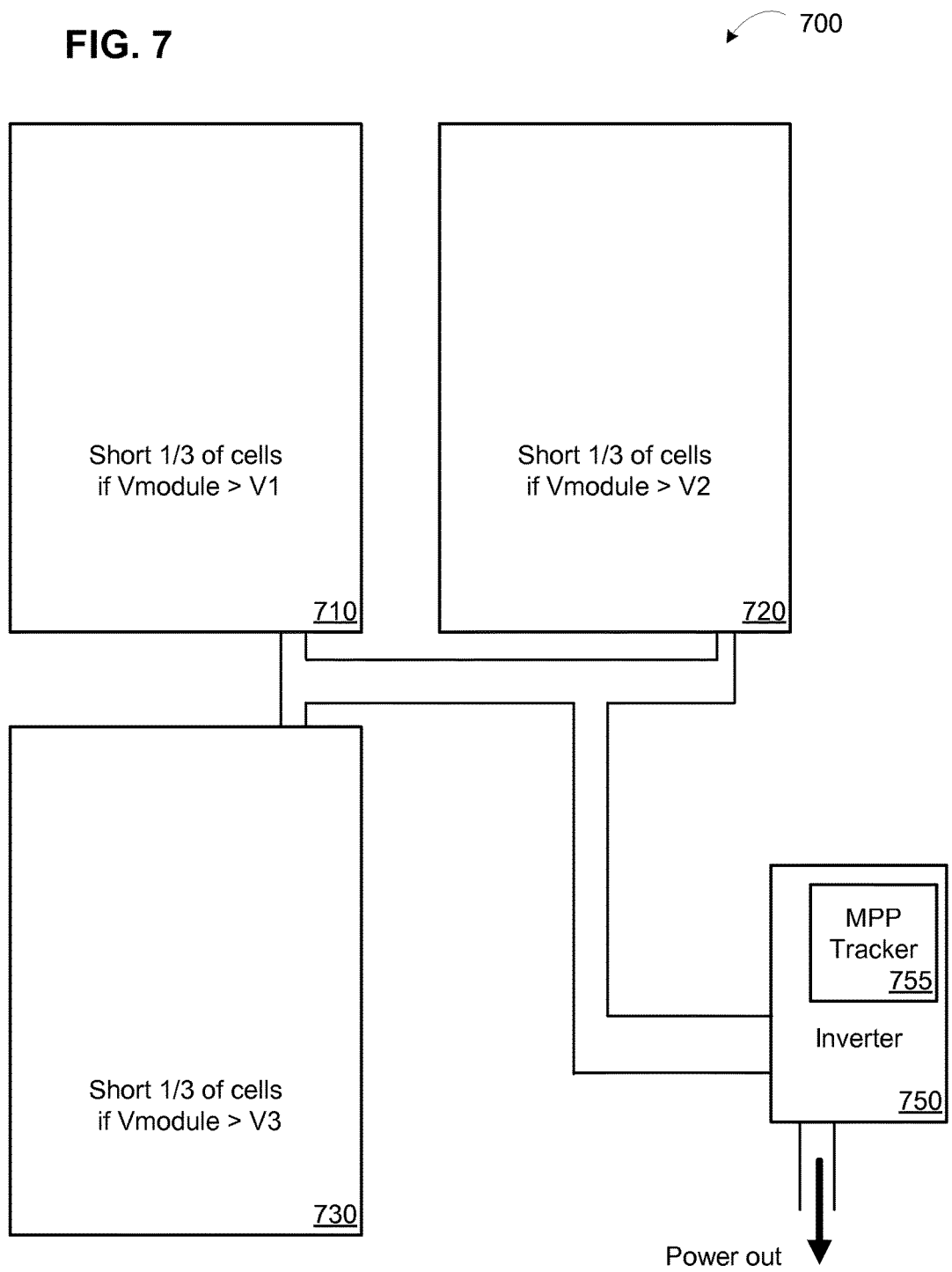
FIG. 7 illustrates one example of a photovoltaic facility 700 that uses three partially-shorting photovoltaic modules.

FIG. 7 illustrates one example of a photovoltaic facility 700 that uses three partially-shorting photovoltaic modules. In this example, facility 700 includes three solar modules 710, 720, 730 and an inverter 750. Modules 710, 720, 730 each include a plurality of solar cells that are connected in series.

Photovoltaic facility 700 resembles photovoltaic facility 500 discussed above. However, each of modules 710, 720, 730 is partially shorted by an internal controller when it produces a voltage $V_{module}$ in excess of a threshold voltage, with the threshold voltages being different from one module to another. In this example, module 710 is partially shorted when its voltage exceeds a threshold $V_1$. Module 720 is partially shorted when its voltage exceeds a threshold $V_2$. Module 730 is partially shorted when its voltage exceeds a threshold $V_3$. When a module 710, 720, or 730 is partially shorted, $\tfrac{1}{3}$ of its internal series-connected solar cells are disconnected. Modules 710, 720, 730 are connected in series with respect to inverter 750. The total voltage generated by the modules is therefore the sum of the voltages generated by modules 710, 720, 730. Because they are all partially shorted when their voltages exceed the highest of the three threshold voltages, the maximum voltage generated by the three modules corresponds to approximately the maximum voltage that would be generated by two of the unshorted modules.

Figure 8:
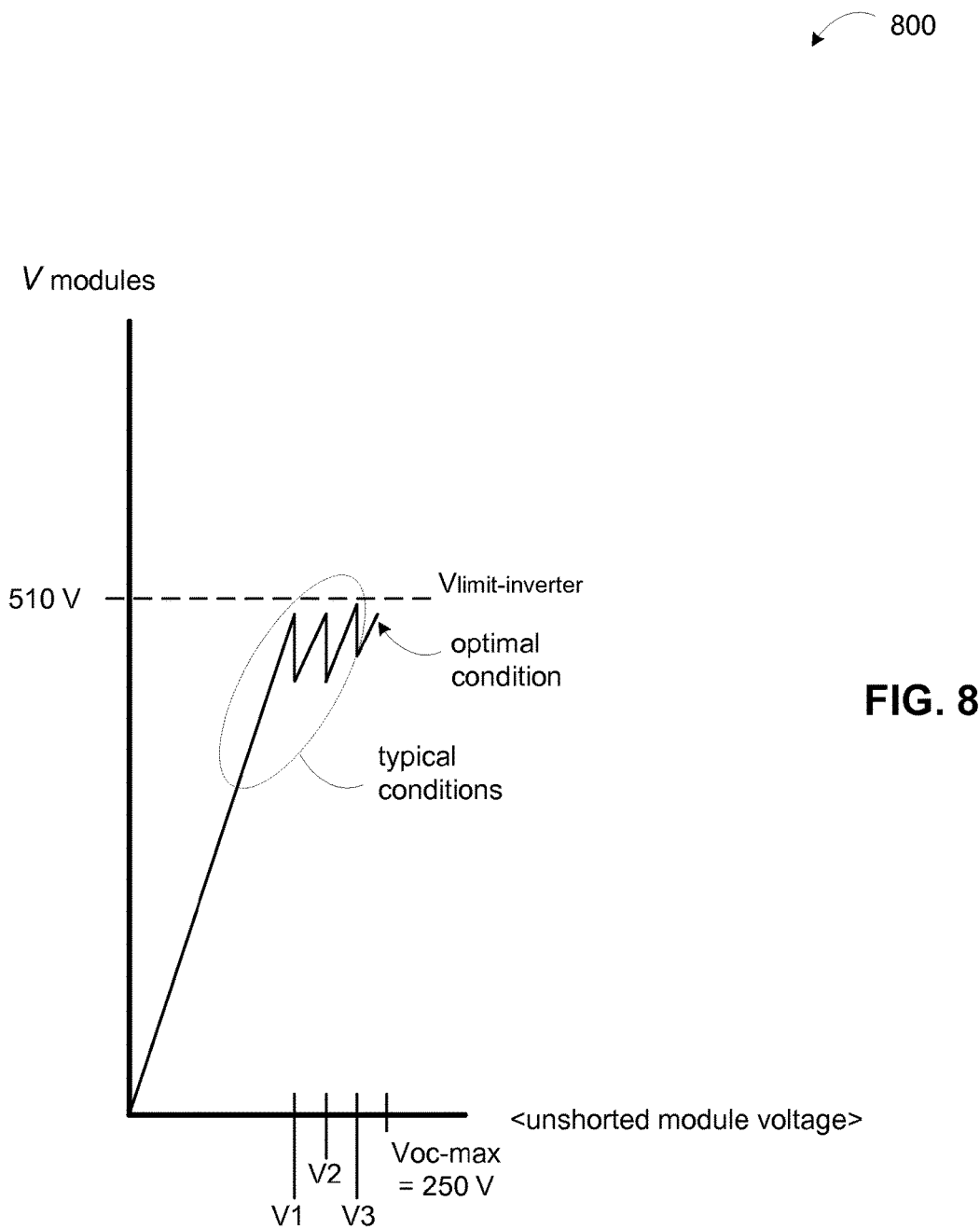
FIG. 8 is a graph showing one example of the relationship between the voltage produced by a series of three partially-shortable modules with different thresholds and the average voltage that would be produced by the unshorted individual modules.

FIG. 8 is a graph showing one example of the relationship between the voltage produced by a series of three partially-shortable modules ($V_{modules}$) with different thresholds and the average voltage that would be produced by the unshorted individual modules (<unshorted module voltage>). In this example, three modules such as modules 710, 720, 730 from FIG. 7 are connected in series so that the voltages of the three modules add. Thus the graph is a line with a slope of 3, for low values of the average unshorted module voltage.

Without partial shorting, the maximum voltage produced by the three modules would exceed the limit voltage $V_{limit-inverter}$ that is acceptable to an inverter used as a load for the modules (e.g., inverter 750). However, because of the automated partial-shorting feature of the modules, the modules operate so that the net voltage generated by the modules effectively drops in increments as the voltage climbs past the three threshold voltages. The graph drops by 1/9 when the average unshorted module voltage reaches the lowest of the three threshold voltages, and 1/3 of the total cells are shorted out. The graph then proceeds to climb with a slope of 8/3. The graph drops by 1/8 when the average unshorted module voltage reaches the second of the three threshold voltages, and another 1/3 of the total cells are shorted out. The graph then proceeds to climb with a slope of 7/3. The graph then drops by 1/7 when the average unshorted module voltage reaches the highest of the three threshold voltages, and yet another 1/3 of the total cells are shorted out. The graph then proceeds to climb with a slope of 6/3 (=2).

As was the case in FIG. 3, the modules in FIG. 7 operate so that adding up the three individual highest-voltage operations ($3 \times 2/3 \times V_{oc\text{-}max}$=250 V in this example) produces less than the limit voltage ($V_{limit\text{-}inverter}$–510 V) that is acceptable to the inverter in this example.

A comparison of FIG. 6 and FIG. 8 shows that the individual thresholds used for partial-shorting in FIG. 7 may lead to yet higher voltages during the typical conditions under which the system operates. This situation implies that—under typical operating conditions—the inverter may be better utilized when connected to an increased number of modules (e.g., 3 modules as in FIG. 7) that automatically partially short some internal cells at different thresholds.

In various situations, the use of modules that automatically short a portion of their internal cells may improve the efficiency of solar installations. Various approaches may be taken for selecting the setpoints or thresholds for each of the modules. By appropriately selecting the voltage thresholds, different modules will limit their voltage at different times and avoid a drastic drop in voltage, enabling the inverter to find more optimal operating points when responding to changes in environment or when curtailing power.

The foregoing discussions describe the shorting or disabling of portions of a solar array to safeguard an inverter from excessive voltage. As noted above, many inverters also have safety limits on power: they need to be safeguarded from excessive input DC power.

Inverters may be configured to protect themselves from excessive input power with modified MPP tracking procedures that reduce the input DC power during high power-production conditions. These inverters may operate at points on an I-V curve that are not optimal for maximum power production, but which lead to safe input power levels for the inverter. Voltages both lower and higher than the $V_{mpp}$ may lead to lower power than at the $V_{mpp}$, so the inverter may either increase or decrease voltage from the $V_{mpp}$ in order to avoid an excessive DC power input. In practice, many inverters are configured to increase voltage above $V_{mpp}$ when needed to reduce power. This is because many inverter runs more efficiently and/or with lower component stress at higher voltages and lower currents than at higher currents and lower voltages.

In various situations, it may be helpful to deploy an oversized DC solar array relative to the AC capacity of inverters that service the array. This may done for a number of reasons, including reducing the total cost of the inverters for an installation, in view of a relatively low cost of the additional solar cells. The disadvantage of this arrangement is that during peak production, the inverters may use modified MPP tracking to significantly limit their DC input power for protection. In most cases, the lower capital expenditures from fewer inverters offsets the lost revenue from limiting power to protect the inverters during peak conditions.

The modified MPP tracking procedures may lead to inverters drawing higher voltages to protect themselves from excessive input power, especially in the situation of inverters connected to oversize arrays. The techniques described above with regard to FIGS. 4-8 may be useful in such situations to additionally protect the inverters from excessive input voltage.

By increasing the operating voltage of an array in order to limit power, an inverter may cause a system equipped with the voltage limiting devices described FIGS. 4-6 to unnecessarily drop the power production of the modules or other system elements they are monitoring. This drop may be seen as the sharp drop shown at $V_{th}$ in FIG. 6. A consequence of having all modules at the same (or substantially the same) threshold voltage is that the shorting controllers (e.g., controller circuit 450) may initiate excessive shorting during a particularly bright and cold day. Because voltage increases with increased irradiance and decreased temperature, such a scenario may result in the maximum power point voltage of a solar module exceeding the voltage threshold setpoints in the shorting controllers. Therefore, as the inverter tracks the maximum power point, it may effectively fall off a cliff as power increases, reducing the modules' voltage by 1/3.

An inverter attempting to reduce input power by decreasing current and increasing voltage may be forced to keep the modules of FIGS. 4-6 in the partially shorted state. The total input voltage may then be limited to 2/3, even if the inverter's MPP tracking system could satisfactorily curtail power at some other point between 2/3 and full system power. This is not ideal because it leads to unnecessary power loss.

The use of modules with different threshold setpoints, as illustrated by the examples in FIGS. 7-8, may be helpful to an inverter that operates to find safe optimal operating conditions. The desired conditions may include (1) limiting input current to a safe level for the inverter, (2) limiting input voltage to a safe level for the inverter, and (3) maximizing power produced by the modules and/or inverter (given (1) and (2)).

In the examples of FIGS. 4-8, the thresholds $V_{th}$, $V_1$, $V_2$, $V_3$ are internal setpoints within the various modules. In other embodiments, an inverter (or other controller element) can actively influence the various modules to limit voltage/power based on the real-time operating conditions of the inverter.

In the examples of FIGS. 7-8, the thresholds $V_1$, $V_2$, $V_3$ are selected so that the total voltage produced by the modules does not experience overly dramatic swings when conditions vary and cause the cells to create more or less voltage or power. With panels that avoid significant swings in the voltage provided to the inverter, the inverter can more readily reach a desirable operating point. The facility overall can operate in situation where enough cells in the modules have been shorted to keep the inverter within power and voltage limits, but no more have been shorted than necessary.

FIGS. 7-8 illustrate a situation with three modules that have three different internally set thresholds $V_1$, $V_2$, $V_3$. A facility may have other numbers of modules and other numbers of thresholds. As one example, a facility may have a string of 16 modules that each short out 1/3 of their internal cells at one of nine threshold voltages.

In this example, each of the 16 modules has a $V_{oc\text{-}max}$ of 40V and a $V_{mpp}$ of 30V. The inverter is limited to 500V on its input. The table below shows how many modules need to short one substring (column $N_{short}$) when the unshorted module voltage is at a specified level. For example, when the module voltage is 40V, only 11 of the 16 modules need to short a substring. The number of modules that short substrings is reduced as module current is increased (and hence voltage is decreased) until at 31V no modules are shorting substrings.

TABLE 1 example of threshold voltages in a 16-panel string.

| $V_{module}$ | $V_{short}$ | $N_{short}$ | $V_{string}$ |
|---|---|---|---|
| 40 | 26.7 | 11 | 493.3 |
| 39 | 26.0 | 10 | 494.0 |
| 38 | 25.3 | 9 | 494.0 |
| 37 | 24.7 | 8 | 493.3 |
| 36 | 24.0 | 7 | 492.0 |
| 35 | 23.3 | 6 | 490.0 |
| 34 | 22.7 | 4 | 498.7 |
| 33 | 22.0 | 3 | 495.0 |
| 32 | 21.3 | 2 | 490.7 |
| 31 | 20.7 | 0 | 496.0 |
| 30 | 20.0 | 0 | 480.0 |

This table is constructed by computing for each row the smallest number $N_{short}$ so that $N_{short}*V_{short}+(16-N_{short})*V_{module}$ is less than 500V. $V_{module}$ is the voltage of a module with no shorted substrings. $V_{short}$ is the voltage of a module with one substring shorted, which is ⅔ the value of the module with no shorted substrings.

Table 1 shows that the net voltage generated by the string stays within a relatively range of 480V to 494V when the non-shorted module voltages are in the range of 30V to 40 V. This narrow range is near the 500V limit of the inverter's input voltage, so the inverter's power point tracking may more readily draw a maximal power but within safe power and voltage limits.

In the situation described by Table 1, two modules are configured with a threshold $V_{th}$ of 32V, two have a threshold of 35V, and one each have thresholds of 33, 34, 36, 37, 38, 39, and 40V. (If the modules are capable of producing voltages higher than 40V, then the five remaining modules in the group of sixteen modules may be equipped with shorting thresholds of 41, 42, 43, 45, and 46V.)

Various techniques may be used to create a collection of solar modules that have a suitable set of threshold voltages. One approach to setting the per-module threshold voltage is to set the threshold voltage for each module at the time the module is installed in a facility. This can be accomplished for example via a switch (e.g., DIP switch or rotary switch) or via setting a value in non-volatile memory. In another embodiment, the device can be factory calibrated with a random clipping threshold within a specified range, such that the probability that all devices in a string would have the same threshold is minimized. In yet another embodiment, a device could generate its own clipping threshold when it starts up, similarly to a hash function based on multiple input parameters (i.e. voltages, temperatures, serial number).

Another approach is for each module to discover its position in the string and to set its own threshold voltage based on that position. The relation between string position and threshold voltage for the example configuration is shown below in the example of Table 2. This example would lead to a collection of modules with threshold setpoints as described above in the example of Table 1.

TABLE 2 example of threshold voltages based on module position in a string

| Position | $V_{th}$ |
|---|---|
| 1 | 32 |
| 2 | 32 |
| 3 | 33 |
| 4 | 34 |
| 5 | 35 |
| 6 | 35 |
| 7 | 36 |
| 8 | 37 |
| 9 | 38 |
| 10 | 39 |
| 11 | 40 |
| 12 | 41 |
| 13 | 42 |
| 14 | 43 |
| 15 | 45 |
| 16 | 46 |

Modules may be able to discover their position in a string by having this set explicitly—for example by a switch or by storing the position in a non-volatile memory. Alternatively a module may discover its position by communicating with its neighbor over the conductor connecting them. For example, on power-up (and periodically thereafter) each module may listen on its negative terminal and transmit on its positive terminal. Initially, modules transmit an "I am here" signal. A module that listens for a predetermined amount of time without detecting an "I am here" symbol determines that it is in position 1 and transmits "Position 1". The module receiving this transmission concludes it is in position 2 and transmits "Position 2". This continues down the string with each module receiving "Position X" and transmitting "Position X+1". Once it discovers its position in the string, a module may set its threshold voltage based on a calculation or a lookup table (e.g., such as Table 2).

In this example, until a module receives its position with high reliability (several repeated transmissions) it sets its threshold voltage as if it were module 1. Thus string voltages may be maintained at safe low levels during the discovery process. With this protocol, failure to receive a message results in modules numbering themselves with numbers that are too low—and hence conservatively setting their threshold voltages lower than the optimum level. Thus a communication failure results in a safe situation, with string voltage staying within limits.

In yet another example of position discovery, each module may discover its position by monitoring the voltage of its negative conductor relative to a shared ground.

Figure 9:
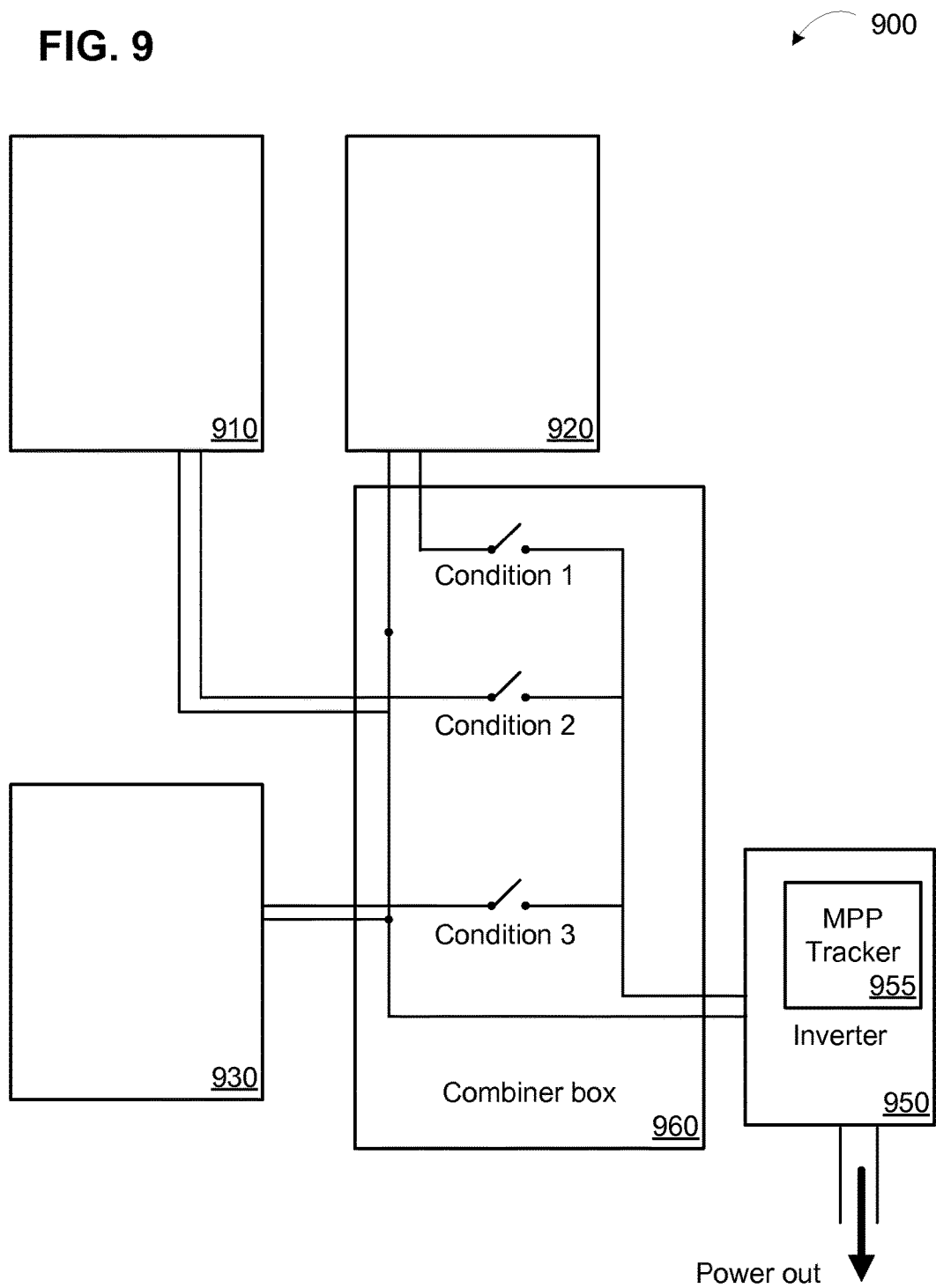
FIG. 9 illustrates one example of a photovoltaic facility 900 that uses three partially-shorting photovoltaic modules.

FIG. 9 illustrates one example of a photovoltaic facility 900 that uses three partially-shorting photovoltaic modules. In this example, facility 900 includes three solar modules 910, 920, 930, an inverter 950, and a combiner box 960. Modules 910, 920, 930 each include a plurality of solar cells that are connected in series. Combiner box 960 is configured to selectively connect or disconnect each of modules 910, 920, 930 from supplying power to inverter 950. When combiner box 960 connects more than one module to inverter 950, the connection is made so that the modules are wired in parallel. Thus, combiner box 960 can selectively add current from zero, one, two, or three modules to supply inverter 950. As illustrated in the example of FIG. 9, combiner box 960 is configured to connect or disconnect modules 910, 920, 930 based on separate criteria, respectively condition 1, condition 2, condition 3. These criteria may be based on current, voltage, or power or combinations thereof, that are received from one or more of the modules.

Combiner box 960 may thus add or eliminate one or more parallel strings of solar cells (or solar modules) to reduce the available current of an array of solar modules feeding into an inverter. Combiner box may be configured with appropriate criteria so that the inverter does not need to increase system voltage to perform power curtailment.

Thus, an MPP tracking system 955 in inverter 950 may be configured to simply track the Mpp point on an I-V curve, without needing to avoid excess-power conditions. This approach may be used by an inverter, in various situations, to operate at a safe, power-optimized operating point. While modules are usually connected in series into strings, in many larger installations many of these strings are connected in parallel at combiner boxes or inverters (or both). At these locations electronics switches (FETs, relays, or other disconnects) can be used as described in FIG. 9 to selectively remove one or more strings from the DC array. Disconnecting one or more parallel strings has the effect of shifting the entire IV curve down.

Combiner box 960 (or other location where strings are paralleled) has control logic that measures voltage and/or current, and takes the appropriate action (such as opening switches to remove strings from the system or closing switches to insert strings into the system). The control of this device may be entirely local, or may be controlled from a central controller, including but not limited to inverter 950. For example, combiner box 960 may measure total array current and remove strings if that current is above a threshold. Additionally, or instead, the combiner might measure voltage. In such situations, the combiner box may rely on an assumption that inverters may increase voltage when trying to limit power. If the voltage reaches above a certain threshold the combiner box may limit the current and power flowing into the inverter by disconnecting strings from the array. The combiner box logic may also take multiple input parameters, such as both a current and a voltage, before outputting control signals to disconnect or reconnect strings from the array.

The techniques described above may be used in situations where an inverter might otherwise not find a suitable safe operating point. In other situations, partial shorting based on several different criteria may help inverters operate more efficiently in a narrow range of operating points. By allowing some devices to start clipping (partially shorting) before others, a facility may be designed to keep the voltage within preferable ranges during a larger portion of an operating period. These preferable ranges may be related to inverter efficiency, but may also be important for keeping inverter temperature, inverter voltage stress, or other parameters in desired ranges.

Figure 10:
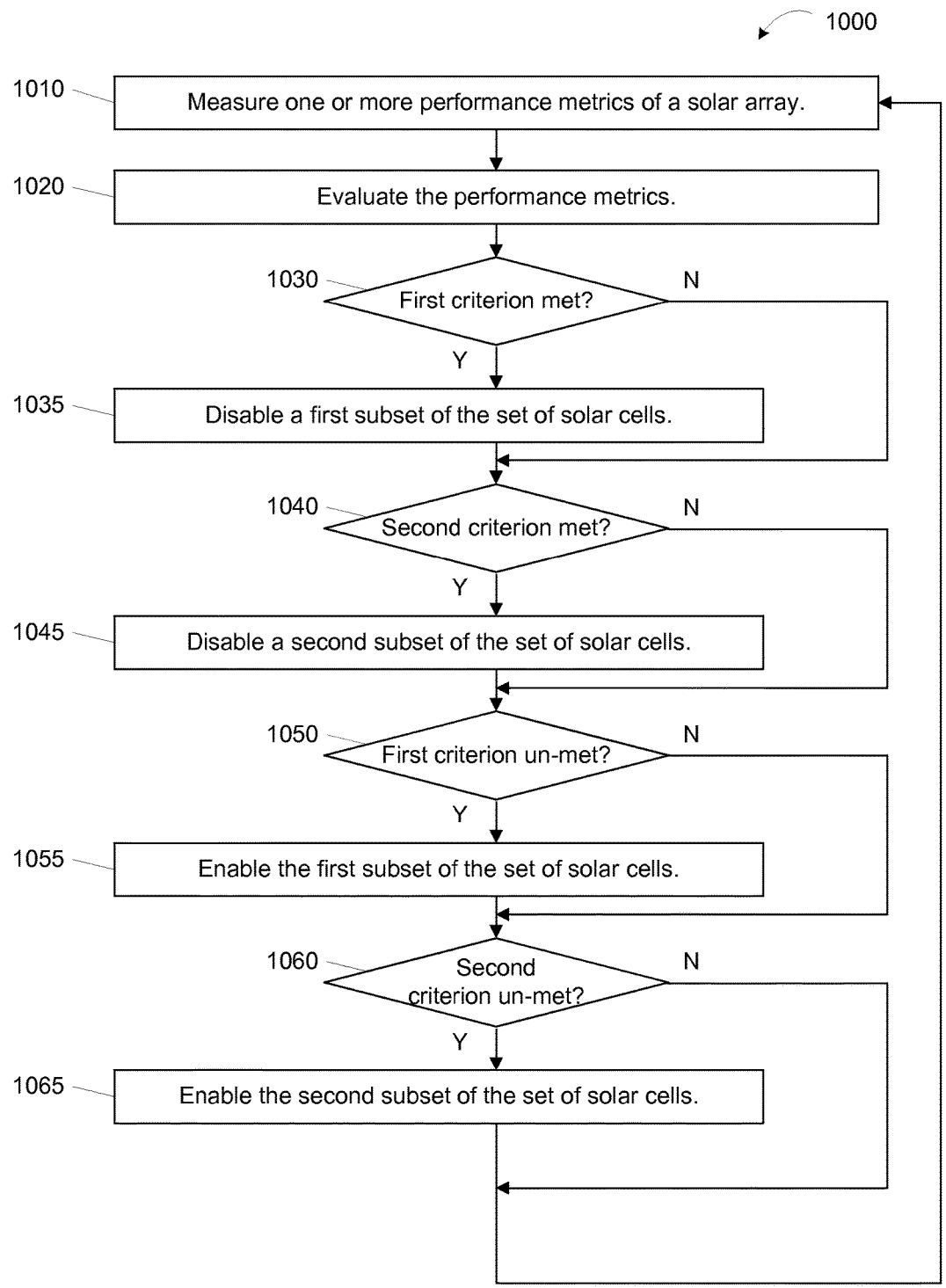
FIG. 10 is a flow diagram of one example of a method for limiting the voltage generated by a collection of solar cells.

FIG. 10 is a flow diagram of one example of a procedure 1000 for limiting the voltage generated by a set of solar cells. Procedure 1000 begins in act 1010 by measuring one or more performance metrics of the set of solar cells. The performance metrics may include voltage, current, power, or combinations thereof, as generated by the set of solar cells or by various subsets of the solar cells. Act 1010 may additionally include measuring environmental factors such as temperature, time of day, incident light angle, and other factors. The performance metrics are evaluated in act 1020. The evaluations are performed to determine whether various criteria have been met by the quantities ascertained in act 1010.

One example of an evaluation performed in act 1020 is a determination whether a solar cell, or a string of solar cells, or a solar module, or a string of solar modules, or other collection of solar cells is producing a voltage greater than (or equal to or greater than) a threshold value. The threshold value may be pre-selected as a setpoint that would be helpful for curtailing the voltage (or power or current) generated by a collection of cells. For example, the threshold value may be relevant for protecting an inverter or other load element from excessive voltage (or excessive power or current).

In act 1030, a determination is made whether a first criterion has been met, according to the evaluations in act 1020. One example of a first criterion being met is a situation where a first module in a string of modules is producing voltage in excess of a first threshold voltage, e.g., 32V.

Act 1035 is performed only if the determination in act 1030 finds that the first criterion has been met. In act 1035, a first subset of the set of solar cells is temporarily disabled. For example, act 1035 may short out one third of a string of solar cells in the first module. In other examples, solar cells may be disabled by opening a circuit that connects the cells to a load or to other components.

In act 1040, a determination is made whether a second criterion has been met, according to the evaluations in act 1020. One example of a second criterion being met is a situation where a second module in a string of modules is producing voltage in excess of a second threshold voltage, e.g., 33V.

Act 1045 is performed only if the determination in act 1040 finds that the second criterion has been met. In act 1045, a second subset of the set of solar cells is temporarily disabled. For example, act 1045 may short out one third of a string of solar cells in the second module. In other examples, solar cells may be disabled by opening a circuit that connects the cells to a load or to other components.

In act 1050, a determination is made whether the first criterion is not met (or is no longer being met), according to the evaluations in act 1020. One example of a first criterion being not met is a situation where the first module in a string of modules is producing voltage less than a third threshold voltage, e.g., $(2/3) \times 32V = 21.3V$. In this example, the factor of $2/3$ reflects a situation where one third of a string of solar cells in the first module was previously shorted out in act 1035. Another example of the first criterion not being met is a situation where the first module in a string of modules is producing voltage less than a third threshold voltage that is selected to avoid bistability, e.g., $0.9 \times (2/3) \times 32V = 19.2V$.

Act 1055 is performed only if the determination in act 1050 finds that the first criterion is not being met. In act 1055, the first subset of the set of solar cells is re-enabled. For example, act 1055 may un-short one third of a string of solar cells in the first module. In other examples, solar cells may be re-enabled by closing a circuit that connects the cells to a load or to other components.

In act 1060, a determination is made whether the second criterion is not met (or is no longer being met), according to the evaluations in act 1020. One example of a second criterion being not met is a situation where the second module in a string of modules is producing voltage less than a third threshold voltage, e.g., $(2/3) \times 33V = 22V$. In this example, the factor of $2/3$ reflects a situation where one third of a string of solar cells in the second module was previously shorted out in act 1045. Another example of the second criterion not being met is a situation where the second module in a string of modules is producing voltage less than a third threshold voltage that is selected to avoid bistability, e.g., $0.9 \times (2/3) \times 33V = 19.8V$.

Act 1065 is performed only if the determination in act 1060 finds that the second criterion is not being met. In act

1065, the second subset of the set of solar cells is re-enabled. For example, act 1065 may un-short one third of a string of solar cells in the second module. In other examples, solar cells may be re-enabled by closing a circuit that connects the cells to a load or to other components.

Procedure 1000 then loops back to act 1010 to perform a new measurement.

A variety of additional or alternative acts may be included in procedure 1000. For example, the disabling of the second subset of the set of solar cells in act 1045 may be restricted to situations in which the first subset of the set of solar cells has already been disabled.

The evaluation of whether a previously-met criterion is no longer being met may involve hysteresis calculations (such as the factor of 0.9 noted above among the examples in acts 1050 and 1060). Alternatively or in addition, these evaluations may refer to a memory that records whether enabling or disabling actions are currently in effect (e.g., whether some solar cells that would affect a performance metric are currently disabled).

In various situations, procedure 1000 may disable solar cells by shorting (or opening) connections adjacent to the solar cells so that the solar cells are disconnected from an inverter or other load. The electrical connections or disconnections may be made using FETs, relays, optically controlled switches, or other controllable electronic switching elements. In various applications, procedure 1000 may be used to protect an inverter or other load element from excessive voltage (or excessive current or excessive power), and the criteria used in acts 1030, 1040, 1050, 1060 may be tailored to the requirements of that inverter or other load element.

Figure 11:
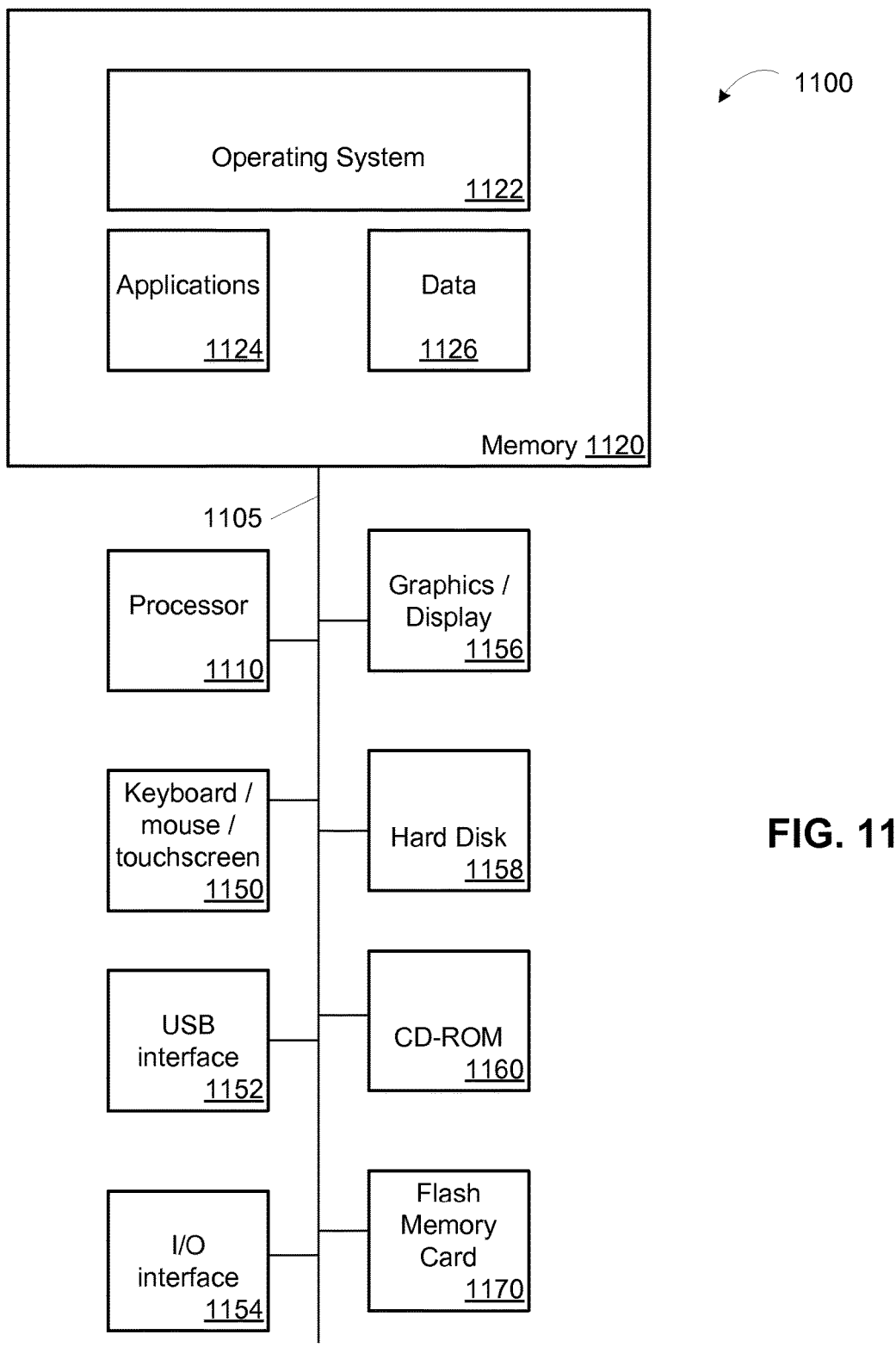
FIG. 11 is a block diagram of one embodiment of a computer system.

FIG. 11 is a block diagram of one embodiment of a computer system. For example, processing system 1100 may be an embodiment of one of the previously described trackers 155, 555, 755, 955, or control unit 450 in module 400, or other control units in modules 510, 520, 530, 710, 720, 730, or in combiner box 960. Processing system 1100 may be employed to implement or oversee procedures such as procedure 1100. Processing system 1100 may include a processor 1110 and a memory 1120 coupled together by a communications bus 1105. Processor 1110 may be a single processor or a number of individual processors working together. Memory 1120 is typically random access memory (RAM), or some other dynamic storage device, and is capable of storing database data 1126 and instructions to be executed by the processor, e.g., operating system 1122 and applications 1124. Applications 1124 may include distributed applications (deployed across more than one processor and/or more than one server), single-host applications, database server applications, measurement routines, evaluation routines, setpoint lookup routines, setpoint determination routines, random number generators, routines for identifying a module's position in a string, communication interfaces, electronic notification tools, and others. Memory 1120 may also be used for storing temporary variables or other intermediate information during the execution of instructions by the processor 1110.

Processing system 1100 may include an I/O interface 1154 that provides communication between processing system 1100 and external components. In various implementations, processing system 1100 may also include input devices such as a keyboard, mouse, or touch screen 1150, a USB interface 1152, output devices such as graphics & display 1156, a hard disk 1158, a CD-ROM 1160, and a removable flash memory card 1170, which may be coupled to processor 1110, e.g., by communications bus 1105. It will be apparent to those having ordinary skill in the art that processing system 1100 may also include numerous elements not shown in the figure, such as additional storage devices, communications devices, input devices, and output devices.

Additional Notes and Examples

Example 1 is a system. The system includes a plurality of solar cells, including a first set of one or more solar cells and a second set of one or more solar cells. The system includes a first control element that is configured to substantially disable a subset of the first set of solar cells in response to the first set of solar cells generating electricity at more than a first threshold voltage. The system includes a second control element that is configured to substantially disable a subset of the second set of solar cells in response to the second set of solar cells generating electricity at more than a second threshold voltage. The first and second threshold voltages are based at least on an operating limit of an inverter coupled to the plurality of solar cells.

Example 2 is a system such as example 1. Moreover, the inverter is a switching inverter, and/or the first and second threshold voltages are based at least on an input voltage limit for the inverter, and/or the first threshold voltage is different than the second threshold voltage, and/or the first control element includes a FET, and/or the first set of solar cells is included in a solar module.

Example 3 is a system such as example 1, further including the inverter.

Example 4 is a system such as example 1. Moreover, the first set of solar cells is connected in series with the second set of solar cells, and the first control element is connected in parallel with the subset of the first set of solar cells.

Example 5 is a system such as example 1. Moreover, the first control element is connected in series with the first set of solar cells, the second control element is connected in series with the second set of solar cells, and a series of the first control element and the first set of solar cells is connected in parallel with a series of the second control element and the second set of solar cells.

Example 6 is a system such as example 1. Moreover, a maximum controlled power generated by the plurality of solar cells is a within a safe range of input power for the inverter.

Example 7 is a system such as example 6. Moreover, an uncontrolled maximum voltage of the plurality of solar cells would be in excess of a safe range of input voltage for the inverter.

Example 8 is a system such as example 1. Moreover, the plurality of solar cells includes additional sets of one or more solar cells.

Example 9 is a system such as example 1 and includes additional control elements, each configured to substantially disable a subset of a corresponding one of the additional sets of solar cells.

Example 10 is a method. The method includes measuring one or more performance metrics of a set of solar cells coupled to at least one inverter. The method includes disabling, based at least on the performance metrics meeting a first criterion, a first subset of the set of solar cells. The method includes disabling, based at least on the performance metrics meeting a second criterion, a second subset of the set of solar cells.

Example 11 is a method such as example 10 in which the disabling the second subset of the set of solar cells is additionally based on the first subset of the set of solar cells being disabled.

Example 12 is a method such as example 10, also including enabling the second subset of the set of solar cells, based at least on the performance metrics not meeting the second criterion. Example 12 also includes enabling the first subset of the set of solar cells, based at least on the performance metrics not meeting the first criterion.

Example 13 is a method such as example 12. Moreover, the enabling the first subset of the set of solar cells is additionally based on the second subset of the set of solar cells being enabled.

Example 14 is a method such as example 10. Moreover, the disabling the first subset of the set of solar cells includes substantially shorting the first subset of the set of solar cells.

Example 15 is a method such as example 10. Moreover, the disabling the second subset of the set of solar cells includes substantially disconnecting the second subset of the set of solar cells from the set of solar cells.

Example 16 is a method such as example 10. Moreover, the first criterion includes a first voltage being above a first threshold level. The first voltage is a voltage generated by a first module that includes the first subset of the set of solar cells. The second criterion includes a second voltage being above a second threshold level. The second voltage is a voltage generated by a second module that includes the second subset of the set of solar cells.

Example 17 is a method such as example 16. Moreover, the first threshold level is recorded in the first module. The second threshold level is recorded in the second module.

Example 18 is a method such as example 16. Moreover, the first and second threshold levels are based on a connectivity positioning of the first module relative to the second module.

Example 19 is a method such as example 16. Moreover, the first and second threshold levels are randomly generated values.

Example 20 is a control system. The control system includes an input and a processor. The input is configured to receive one or more performance metrics of a set of solar cells coupled to at least one inverter. The processor is configured to evaluate the performance metrics. The processor is configured to, based at least on the performance metrics meeting a first criterion, disable a first subset of the set of solar cells. The processor is configured to, based at least on the performance metrics meeting a second criterion, disable a second subset of the set of solar cells.

Example 21 is a non-transitory, machine-accessible storage medium having instructions stored thereon. The instructions are configured so that when they are executed on a machine, they cause the machine to measure one or more performance metrics of a set of solar cells coupled to at least one inverter. The machine is also caused to disable, based at least on the performance metrics meeting a first criterion, a first subset of the set of solar cells. The machine is also caused to disable, based at least on the performance metrics meeting a second criterion, a second subset of the set of solar cells.

The foregoing description presents one or more embodiments of various systems and methods. It should be noted that these and any other embodiments are exemplary and are intended to be illustrative of the invention rather than limiting. While the invention is widely applicable to various types of technologies and techniques, a skilled person will recognize that it is impossible to include all of the possible embodiments and contexts of the invention in this disclosure.

Furthermore, those skilled in the art will recognize that boundaries between the functionality of the above described acts, steps, and other operations are merely illustrative. The functionality of several operations may be combined into a single operation, and/or the functionality of a single operation may be distributed in additional operations. Moreover, alternative embodiments may include multiple instances of a particular operation or may eliminate one or more operations, and the order of operations may be altered in various other embodiments. Those of skill in the art may implement the described functionality in varying ways for each particular application, but such implementation decisions should not be interpreted as causing a departure from the spirit or scope of the present invention.

Some benefits and advantages that may be provided by some embodiments have been described above. These benefits or advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. While the foregoing description refers to particular embodiments, it should be understood that the embodiments are illustrative and that the scope of the invention is not limited to these embodiments. Many variations, modifications, additions, and improvements to the embodiments described above are possible.

Examples of logic elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, application programs, operating system software, firmware, subroutines, application program interfaces (API), or others, or any combination thereof.

Some systems or supporting systems may be implemented, for example, using a machine or tangible computer-readable medium or article which may store an instruction or a set of instructions that, if executed by a machine, may cause the machine to perform a method and/or operations in accordance with the embodiments. In some implementations, one or more instances of these programs may be executed on one or more separate computer systems or separate processor units, e.g., in a distributed system, a multi-processor architecture, a multi-core architecture. Thus, although certain steps have been described as being performed by certain devices, software programs, processes, or entities, this need not be the case and a variety of alternative implementations will be understood by those having ordinary skill in the art. Instructions may be stored on machine-readable medium such as a magnetic medium (e.g., hard disk, floppy disk, tape), a semiconductor medium (e.g., flash memory, RAM), an optical medium (e.g., CD, DVD), or others, or combinations thereof. One or more aspects of a system may include representative instructions stored on a machine-readable medium that represents various logic within a processor, which when read by a machine causes the machine to fabricate logic to perform the techniques described herein. The software programs may also be carried in a communications medium conveying signals encoding the instructions.

Various actions described herein involve operations performed by electronic computing devices that manipulate and/or transform data represented as physical quantities (e.g., electronic) within the computing system's registers and/or memories into other data similarly represented as physical quantities within the computing system's memories, registers or other such information storage, transmission, or display devices.

What is claimed is:

1. A system comprising:
   a plurality of solar cells, wherein the plurality of solar cells comprises
      a first set of solar cells,
      a second set of solar cells, wherein the first and second sets of solar cells are first and second strings included in a same module and connected in series with one another;
   a first control element configured to substantially disable a subset of the first set of solar cells in response to the first set of solar cells generating electricity at more than a first threshold voltage; and
   a second control element configured to substantially disable a subset of the second set of solar cells in response to the second set of solar cells generating electricity at more than a second threshold voltage, wherein the first and second threshold voltages are based at least on an operating limit of an inverter coupled to the plurality of solar cells.

2. The system of claim 1, wherein:
   the inverter is a switching inverter;
   the first and second threshold voltages are based at least on an input voltage limit for the inverter;
   the first threshold voltage is different than the second threshold voltage;
   the first control element comprises a field-effect transistor; and
   the first set of solar cells is comprised in a solar module.

3. The system of claim 1, further comprising the inverter.

4. The system of claim 1, wherein:
   the first set of solar cells is connected in series with the second set of solar cells; and
   the first control element is connected in parallel with the subset of the first set of solar cells.

5. The system of claim 1, wherein:
   the first control element is connected in series with the first set of solar cells;
   the second control element is connected in series with the second set of solar cells; and
   a series of the first control element and the first set of solar cells is connected in parallel with a series of the second control element and the second set of solar cells.

6. The system of claim 1, wherein a maximum controlled power generated by the plurality of solar cells is a within a safe range of input power for the inverter.

7. The system of claim 6, wherein an uncontrolled maximum voltage of the plurality of solar cells would be in excess of a safe range of input voltage for the inverter.

8. The system of claim 1, wherein the plurality of solar cells further comprises:
   additional sets of solar cells.

9. The system of claim 8, comprising:
   additional control elements, each configured to substantially disable a subset of a corresponding one of the additional sets of solar cells.

10. A method comprising:
    measuring one or more performance metrics of a set of solar cells coupled to at least one inverter;
    based at least on the performance metrics meeting a first criterion, disabling a first subset of the set of solar cells; and
    based at least on the performance metrics meeting a second criterion, disabling a second subset of the set of solar cells, wherein the first and second subsets of solar cells are first and second strings included in a same module and connected in series with one another.

11. The method of claim 10, wherein the disabling the second subset of the set of solar cells is additionally based on the first subset of the set of solar cells being disabled.

12. The method of claim 10, further comprising:
    based at least on the performance metrics not meeting the second criterion, enabling the second subset of the set of solar cells; and
    based at least on the performance metrics not meeting the first criterion, enabling the first subset of the set of solar cells.

13. The method of claim 12, wherein the enabling the first subset of the set of solar cells is additionally based on the second subset of the set of solar cells being enabled.

14. The method of claim 10, wherein the disabling the first subset of the set of solar cells comprises substantially shorting the first subset of the set of solar cells.

15. The method of claim 10, wherein the disabling the second subset of the set of solar cells comprises substantially disconnecting the second subset of the set of solar cells from the set of solar cells.

16. The method of claim 10, wherein:
    the first criterion comprises a first voltage being above a first threshold level, wherein the first voltage is a voltage generated by a first module that comprises the first subset of the set of solar cells; and
    the second criterion comprises a second voltage being above a second threshold level, wherein the second voltage is a voltage generated by a second module that comprises the second subset of the set of solar cells.

17. The method of claim 16, wherein:
    the first threshold level is recorded in the first module; and
    the second threshold level is recorded in the second module.

18. The method of claim 16, wherein:
    the first and second threshold levels are based on a connectivity positioning of the first module relative to the second module.

19. The method of claim 16, wherein:
    the first and second threshold levels are randomly generated values.

20. A control system comprising:
    an input configured to receive one or more performance metrics of a set of solar cells coupled to at least one inverter; and
    a processor configured to
       evaluate the performance metrics,
       based at least on the performance metrics meeting a first criterion, disable a first subset of the set of solar cells, and
       based at least on the performance metrics meeting a second criterion, disable a second subset of the set of solar cells, wherein the first and second sets of solar cells are first and second strings included in a same module and connected in series with one another.

* * * * *